United States Patent
Nielson et al.

(10) Patent No.: US 10,317,629 B2
(45) Date of Patent: *Jun. 11, 2019

(54) CONNECTOR FOR TRANSITIONING MULTI-CORE FIBER TO PLURAL SINGLE CORE FIBERS

(71) Applicant: CommScope, Inc. of North Carolina, Hickory, NC (US)

(72) Inventors: Jeffrey D. Nielson, Longmont, CO (US); Paul F. Kolesar, McKinney, TX (US); Gary F. Gibbs, Wylie, TX (US); Bradley Billman, Sachse, TX (US); Richard L. Case, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,388

(22) Filed: Jun. 9, 2018

(65) Prior Publication Data

US 2018/0292615 A1    Oct. 11, 2018

Related U.S. Application Data

(63) Continuation of application No. 15/248,264, filed on Aug. 26, 2016, now Pat. No. 9,995,885, which is a
(Continued)

(51) Int. Cl.
*G02B 6/38*   (2006.01)
*G02B 6/44*   (2006.01)
*G02B 6/02*   (2006.01)

(52) U.S. Cl.
CPC ....... *G02B 6/3885* (2013.01); *G02B 6/02042* (2013.01); *G02B 6/3851* (2013.01);
(Continued)

(58) Field of Classification Search
CPC .............. G02B 6/3885; G02B 6/02042; G02B 6/3851; G02B 6/4471; G02B 6/4472; G02B 6/4475
See application file for complete search history.

(56) References Cited

U.S. PATENT DOCUMENTS

| 4,708,433 A | 11/1987 | Kakii et al. |
| 5,077,815 A | 12/1991 | Yoshizawa et al. |

(Continued)

FOREIGN PATENT DOCUMENTS

| FR | 2717913 | 9/1995 |
| JP | 2000081544 | 3/2000 |
| WO | WO 2010/147762 | 12/2010 |

*Primary Examiner* — Akm E Ullah
(74) *Attorney, Agent, or Firm* — Muncy, Geissler, Olds & Lowe, P.C.

(57) ABSTRACT

A method and system connects multiple cores within one fiber, e.g., a multi-core fiber (MCF), to multiple fibers with single-cores. The single-core fibers can then be terminated by traditional envelopes, such as a single core LC envelope. A connector holds the single-core fibers into a pattern that matches a pattern of all, or a sub group, of the individual cores of the MCF. The single-core fibers may all be terminated to individual connectors to form a fanout or breakout cable. Alternatively, the single-core fibers may extend to another connector wherein the single-core fibers are regrouped into a pattern to mate with the cores of another MCF, hence forming a jumper. One or more of the single core fibers may be terminated along the length of the jumper to form a jumper with one or more tap accesses.

20 Claims, 15 Drawing Sheets

Related U.S. Application Data continuation of application No. 14/170,781, filed on Feb. 3, 2014, now Pat. No. 9,429,721.

(60) Provisional application No. 61/759,547, filed on Feb. 1, 2013.

(52) U.S. Cl.
CPC ......... *G02B 6/4471* (2013.01); *G02B 6/4472* (2013.01); *G02B 6/4475* (2013.01)

(56) References Cited

U.S. PATENT DOCUMENTS

| | | | |
|---|---|---|---|
| 5,231,685 A | 7/1993 | Hanzawa et al. | |
| 5,682,452 A * | 10/1997 | Takahashi | G02B 6/2937 385/34 |
| 5,734,773 A | 3/1998 | Teshima et al. | |
| 5,892,582 A | 4/1999 | Bao et al. | |
| 6,154,594 A | 11/2000 | Fiacco et al. | |
| 6,258,413 B1 * | 7/2001 | Woelki | F16C 33/201 427/402 |
| 6,485,191 B1 | 11/2002 | Sato | |
| 7,267,494 B2 | 9/2007 | Deng et al. | |
| 7,306,376 B2 | 12/2007 | Scerbak et al. | |
| 7,520,677 B2 | 4/2009 | Barnes et al. | |
| 7,548,674 B1 * | 6/2009 | Horibe | G02B 6/40 385/115 |
| 7,604,417 B2 | 10/2009 | Nielson et al. | |
| 7,625,129 B2 | 12/2009 | Nielson et al. | |
| 8,038,354 B2 | 10/2011 | Nielson et al. | |
| 8,132,971 B2 | 3/2012 | Luther et al. | |
| 8,175,431 B2 | 5/2012 | Imada et al. | |
| 8,529,138 B2 | 9/2013 | Duis et al. | |
| 9,016,953 B2 | 4/2015 | Ott et al. | |
| 9,151,923 B2 | 10/2015 | Nielson et al. | |
| 9,429,721 B2 * | 8/2016 | Nielson | G02B 6/3885 |
| 9,470,558 B2 * | 10/2016 | Tan | G01D 5/3473 |
| 9,612,177 B2 | 4/2017 | Clarke et al. | |
| 2003/0190130 A1 | 10/2003 | Welker et al. | |
| 2004/0037510 A1 * | 2/2004 | Mukouda | G02B 6/3833 385/71 |
| 2004/0189321 A1 * | 9/2004 | Drexler | B24B 19/226 324/538 |
| 2005/0084216 A1 * | 4/2005 | Yang | G02B 6/381 385/71 |
| 2006/0029334 A1 | 2/2006 | Quinby et al. | |
| 2010/0158444 A1 | 6/2010 | Imada et al. | |
| 2011/0229085 A1 | 9/2011 | Bradley et al. | |
| 2011/0229086 A1 * | 9/2011 | Bradley | G02B 6/3885 385/78 |
| 2011/0274398 A1 | 11/2011 | Fini et al. | |
| 2012/0219254 A1 * | 8/2012 | Bradley | G02B 6/3885 385/78 |
| 2012/0219255 A1 | 8/2012 | Bradley et al. | |
| 2013/0163072 A1 | 6/2013 | Chang et al. | |
| 2013/0251320 A1 | 9/2013 | Hayashi | |
| 2014/0219609 A1 | 8/2014 | Nielson et al. | |

\* cited by examiner

CONNECTOR FOR TRANSITIONING MULTI-CORE FIBER TO PLURAL SINGLE CORE FIBERS

This application is a continuation of U.S. application Ser. No. 15/248,264 filed Aug. 26, 2016, which is a continuation of U.S. application Ser. No. 14/170,781 filed Feb. 3, 2014, now U.S. Pat. No. 9,429,721 granted Aug. 30, 2016, which claims the benefit of U.S. Provisional Application No. 61/759,547, filed Feb. 1, 2013. The contents of each application are herein incorporated by reference.

BACKGROUND OF THE INVENTION

1. Field of the Invention

The present invention relates to fiber optic cordage useful as a fanout, a partial fanout, such as a jumper with one or more taps, or a jumper to reorder cores of a multi-core fiber (MCF). More particularly, the present invention relates a connector for such cordage, wherein the connector has several single core fibers arranged within a single holder of a ferrule, so as to mate with all, or several, cores of a MCF of a mating connector, such that the MCF is broken out into single core fibers, which can be more easily and conventionally manipulated.

2. Description of the Related Art

Optical network operators are continuing to look for ways to obtain increased density of optical fiber networks. One method for packaging higher numbers of light carrying paths in a small space is through the use of a MCF. A MCF typically comprises a central core surrounded by several satellite cores in a radial pattern surrounding the central core. Each of the central and satellite cores is potentially a light carrying path, and the MCF thus provides multiple parallel paths for optical signal transmission and/or reception in a single fiber.

A MCF is known in the existing arts. See for example, U.S. Pat. Nos. 5,734,773 and 6,154,594 and U.S. Published Applications 2011/0229085, 2011/0229086 and 2011/0274398, each of which is herein incorporated by reference. In the background art of U.S. Published Application 2011/0274398, as depicted in FIGS. 1 and 2, a MCF 180 has a central core 181 and multiple satellite cores 182, e.g., six satellite cores 182-1, 182-2, 182-3, 182-4, 182-5 and 182-6, in a common cladding layer 184. The satellite cores 182 are positioned around the central core 181 symmetrically, at the vertices of a regular hexagon 183.

Each of the central and satellite cores 181 and 182 exhibits a same diameter. The central core 181 and each of the satellite cores 182 has a diameter of about 26 micrometers (um), depicted as distance A in FIG. 2. A center to center spacing between adjacent central and satellite cores 181 and 182 is about 39 um, depicted as distance B in FIG. 2. Other dimensions and spacing, besides those shown in U.S. Published Application 2011/0274398, as depicted in FIGS. 1 and 2, are known in the background art. Also, more or fewer satellite cores 182 are known in the background art. Each of the central and satellite cores 181 and 182 may carry a unique light signal. Each MCF 180 is affixed within a ferrule and terminates at or near an end surface 245 of the ferrule. The ferrule may be part of a connector, which facilitates communicating the signals of the central and satellite cores 181 and 182 to a device via a port, or to further cabling via an adapter.

FIG. 3 depicts a typical connector 201 having a cylindrical ferrule 203 with a holder, e.g., a cylindrical central bore, presenting an end of a single MCF 180 for mating to another connector, via an adapter, or for communicating with a port of a device. FIG. 3A is a perspective view showing a ferrule assembly 232 within the connector 201, which extends along an axis 236. The ferrule assembly 232 includes the ferrule 203, a ferrule barrel 241 and tubing 242. The ferrule 203 has its holder formed as a precision hole extending down its length, along axis 236. The hole is shaped to closely receive a bare MCF 180 from a stripped end of an optical fiber cable 244. The bare MCF 180 is cleaved at the ferrule's end surface 245 and polished, resulting in an exposed fiber end face, as depicted in FIG. 2. Ferrule barrel 241 includes a hexagonal flange 246 and a front cone portion 249 having a pair of slots 247 in its perimeter. The structures of FIG. 3A are conventional and can be seen in US Patent Application Publication 2011/0229085.

FIG. 4 depicts an MT-type ferrule 303 having first and second holes 305 and 307 for accepting alignment pins of a mating ferrule. Between the first and second holes 305 and 307, the MT-type ferrule 303 presents an array of twelve fiber ends of MCFs 180-1 through 180-12 for communicating to MCFs of the mating ferrule. The fiber ends are located within holders, e.g., cylindrical channels, of the ferrule 303. An access window 309 opens to the MCFs 180-1 through 180-12 and can be used to flood epoxy into the v-grooves below the window 309 and/or the cylindrical channels, as is conventional in the art. US Patent Application Publication 2004/0189321, which is herein incorporated by reference, shows a typical MT ferrule.

Although FIG. 3 shows an LC type connector 201 and FIG. 4 shows a MT ferrule 303, which could be used in a MPO/MTP type connector, other connector styles for presenting a single MCF or multiple MCFs in an ordered array are known in the existing art, such as ST, SC and MT-RJ. Further the row of MCFs presented by the ferrule 303 may include more or fewer MCFs, such as eight or sixteen MCFs in one or two or more rows. Hereinafter, the term holder is broad enough to encompass all structures holding a fiber, such as v-grooves and channels with circular or other non-circular cross sectional shapes.

Fiber optic jumpers, patch cords, trunk cables, fanouts and other cable configurations provide optical connectivity in numerous spaces including local area networks (LANs), wide area networks (WANs), datacenters, vehicles, aircraft and ships. Historically, fanouts and jumpers have used one or more single-core optical fibers to mate with one or more single-core optical fibers presented by a termination. With the advent of the MCF, new fanouts and new jumpers are needed to deal with the multiple cores within a MCF.

SUMMARY OF THE INVENTION

The Applicant has appreciated that some applications, i.e. patching, link testing, link monitoring, cross connects, etc. require the optical cores of a MCF to be separated and routed to different termination points. It would be desirable to provide an easy and effective way of routing one or more individual cores of a MCF to different locations.

It is an object of the present invention to address one or more of the needs in the prior art, as appreciated by the Applicant.

The Applicant has appreciated that it would be beneficial to provide fanout cordage or jumper cordage with one or more taps, which can mate with one or more MCFs presented by a ferrule, wherein the cordage is constructed of single-core fibers, such that terminations at the remote end of the fanout cordage, or at the intermediate tap or taps along the jumper cordage, can be made using conventional single core connectors. The Applicant has also appreciated that a jumper with single-core fibers can be used to reorder cores of a MCF from a first end of the jumper to a second end of the jumper. The reordering of the cores may facilitate various connection methods, daisy-chaining patch cords between devices, and/or data security.

These and other objectives are accomplished by a method and system for connecting multiple cores within one fiber, e.g., a MCF, to multiple fibers with single-cores. The single-core fibers can then be terminated by traditional envelopes, such as a typical single core LC type envelope, as depicted in FIG. 3. The invention provides a connector holding the single-core fibers into a pattern that matches a pattern of all, or a sub group, of the individual cores of the MCF. The single-core fibers may all be terminated to individual connectors to form a fanout or breakout cable. Alternatively, the single-core fibers may extend to another connector wherein the single-core fibers are regrouped into a pattern to mate with the cores of another MCF, hence forming a jumper. One or more of the single core fibers may be terminated along the length of the jumper to form a jumper with one or more tap accesses.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
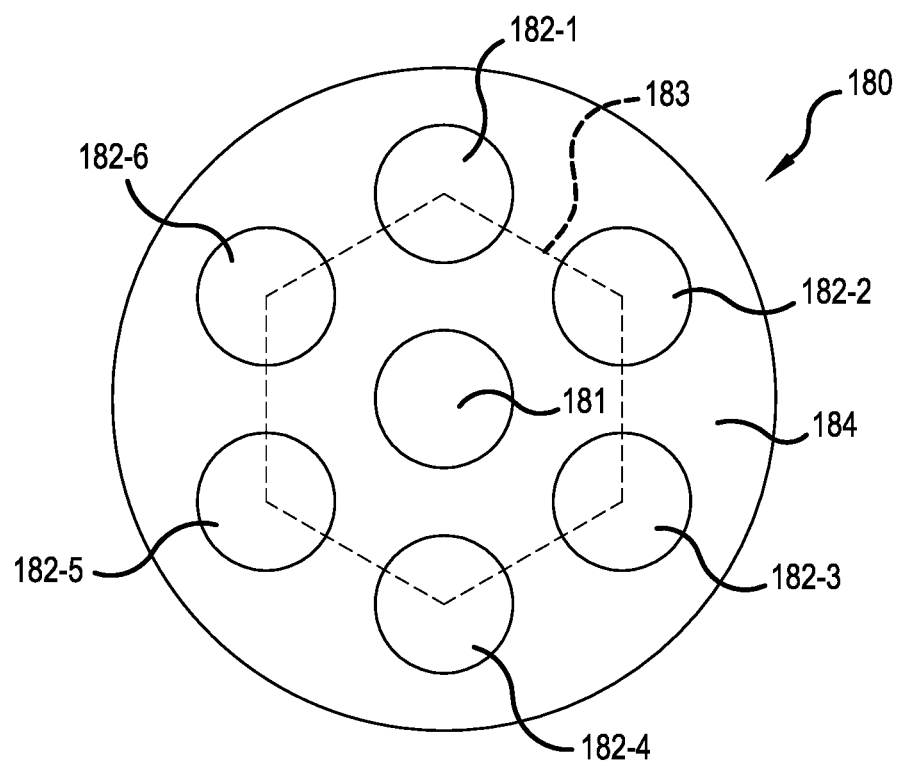
FIG. 1 is an end view of a multi-core optical fiber, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

The invention described herein guides light from multiple cores within one fiber, e.g., a MCF, to multiple fibers, each with a single-core. The single-core fibers can then be terminated by traditional methods. The inventive device, a first example of which is illustrated in FIGS. 5-6, groups multiple single-core fibers into a pattern that matches a pattern of individual cores of the MCF.

Figure 5:
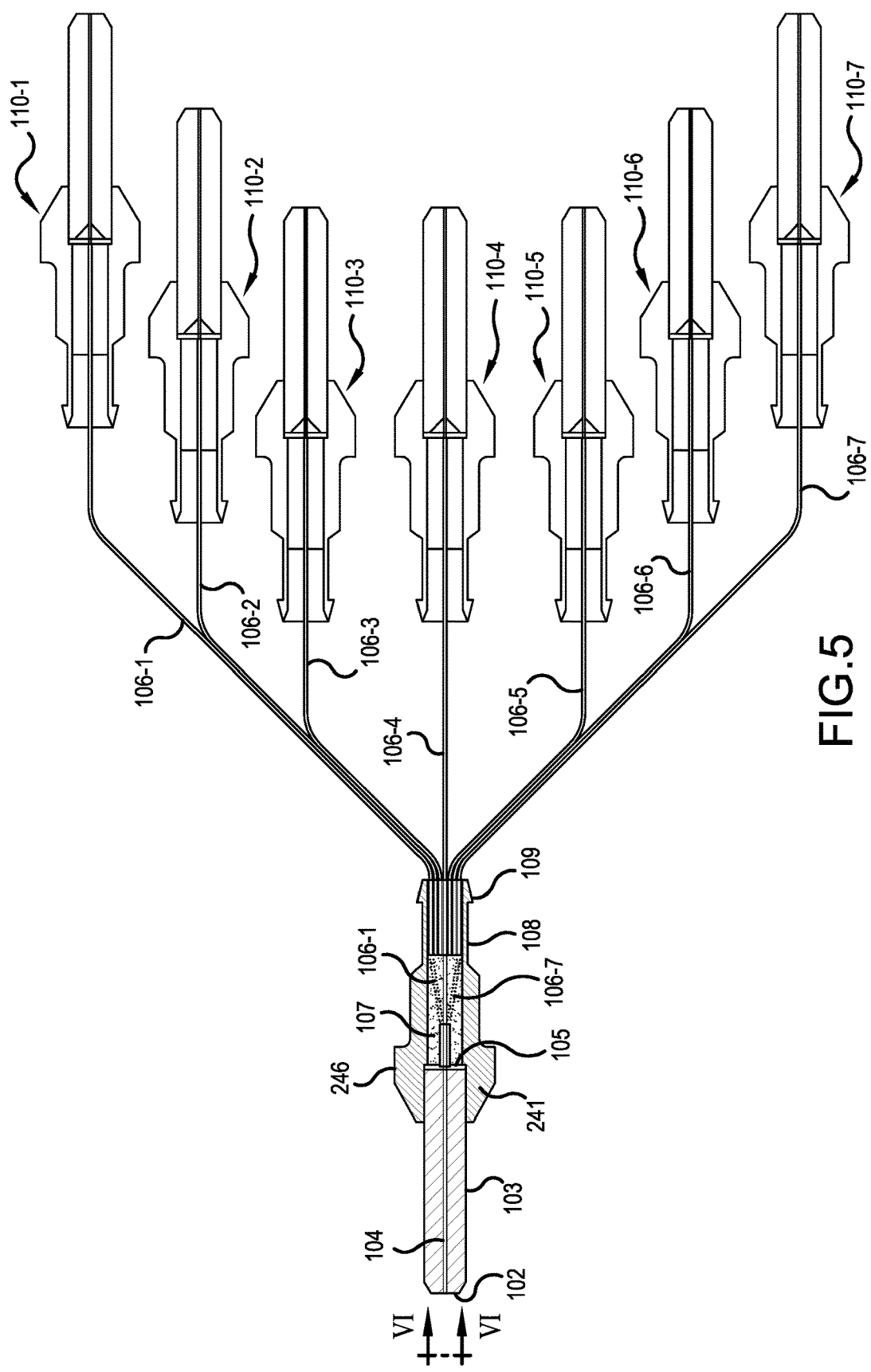
FIG. 5 is a cross sectional view showing a fanout from a ferrule assembly, in accordance with a first embodiment of the present invention.
Figure 6:
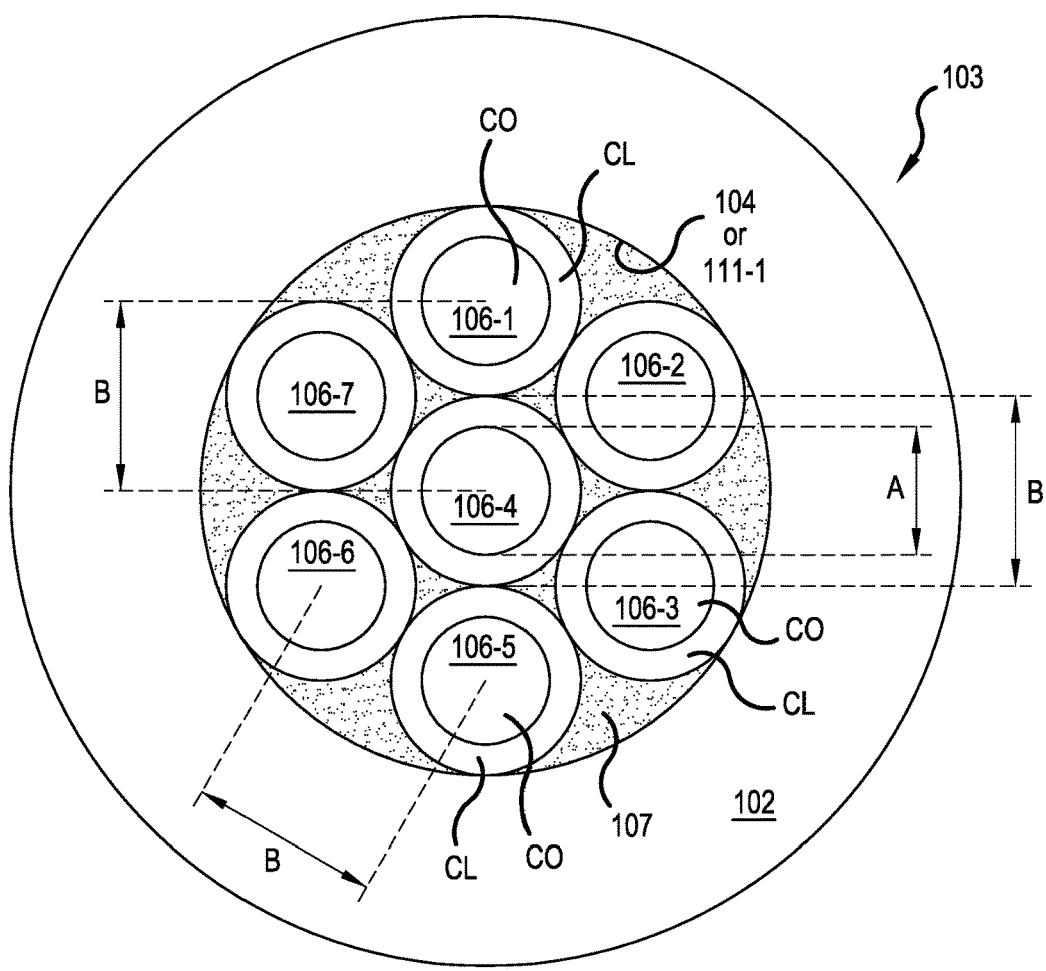
FIG. 6 is a close-up view of an end surface of the ferrule assembly, taken along line VI-VI in FIGS. 5 and 8.

FIGS. 5-6 show a connector system, in accordance with a first embodiment of the present invention. A ferrule 103 has an end surface 102. A holder 104 is formed in the ferrule 103 and extends from a first or entrance end 105 of the ferrule 103 up to a second end of the ferrule 103, presenting the end surface 102.

A plurality of single-core optical fibers 106, such as seven single-core fibers 106-1, 106-2, 106-3, 106-4, 106-5, 106-6 and 106-7, are mounted in the holder 104 with first ends of the plurality of single-core optical fibers 106 arranged in a given pattern at the end surface 102 of the ferrule 103. The given pattern is best seen in the end view of FIG. 6.

FIG. 6 shows the ferrule 103 holding six single-core fibers 106-1, 106-2, 106-3, 106-5, 106-6 and 106-7 equally spaced around a seventh single-core fiber 106-4. All the single-core fibers 106 having the same core (CO) diameter and the same cladding (CL) diameter. The core CO (center circle in each single-core fiber 106) has a diameter A, which is sized to closely match each core diameter A in the conventional MCF 180 depicted in FIG. 2, e.g., about 26 um. The cladding CL (outer ring encircling the core in each single-core fiber 106) has a diameter B, which is about 39 um. The dimension B of the cladding CL creates offset distances equal to distance B between the centers of the cores CO, which match the offset distances B in the MCF 180 of FIG. 2, such that efficient unidirectional or bidirectional transmission can occur between the seven single-core fibers 106-1 through 106-7 and the cores 181 and 182-1 through 182-6 of the MCF 180, when the fiber ends are aligned and mated within an adapter.

Figure 3:
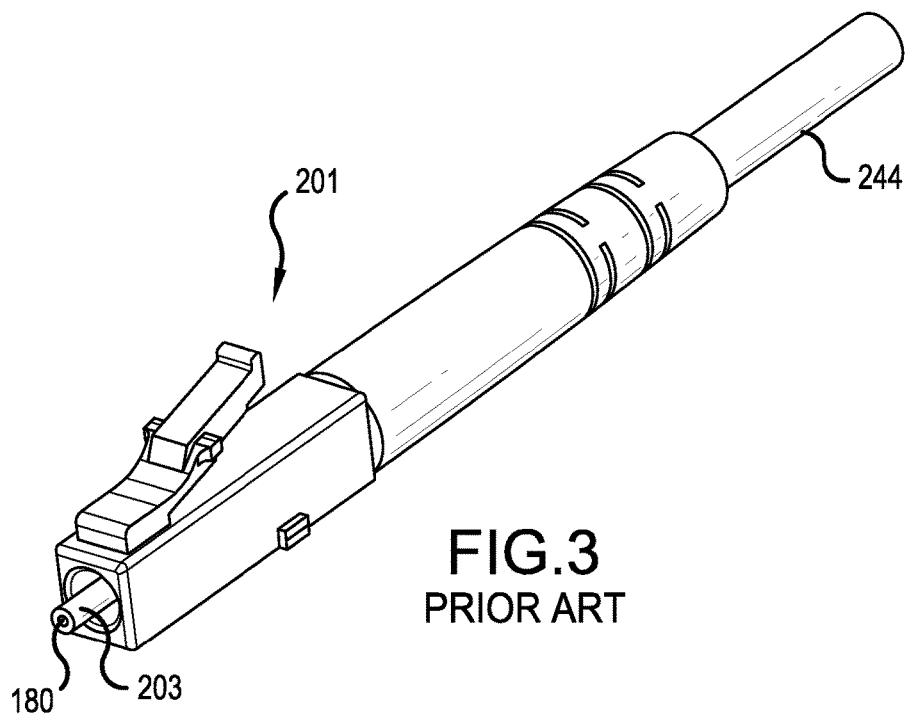
FIG. 3 is a perspective view of an LC fiber optic connector, in accordance with the prior art.

The single-core fibers 106 are held in place by epoxy 107. The epoxy 107 is cured thermally or anaerobically, by UV light or other means. The ferrule 103 may be held by a ferrule barrel 241 having flanges 246, in a same or similar manner as the ferrule 203 is held in the prior art of FIG. 3A. The rear of the ferrule barrel 241 may include a collar 108 with a retaining ridge 109 to hold the tube 242 of FIG. 3A. The ferrule 103 and ferrule barrel 241 may be added to the connector envelope, as depicted in FIG. 3, to form an LC connector.

FIG. 5 depicts an individual fiber connector 110-1 through 110-7 attached to a second end of each of the plurality of single-core optical fibers 106-1 through 106-7, respectively. A length of each single-core optical fiber 106-1 through 106-7 between the ferrule 103 and the individual fiber connectors 110-1 through 110-7 includes a polymer coating and/or a jacket. After, or as, the single-core optical fibers 106-1 through 106-7 enter the ferrule barrel 241, any jacket is removed, leaving only the core, cladding and potentially an acrylate coating. Before, or as, the single-core optical fibers 106-1 through 106-7 enter the holder 104 within the ferrule 103, the acrylate layer is removed. This leaves only the core CO and cladding CL on each single-core optical fiber 106-1 through 106-7, such that the cladding CL layers abut each other, as shown in FIG. 6. Although the acrylate layers have been described as being removed from the single-core fibers 106 at portions within the ferrule 103, the bare acrylate layers may extend through the ferrule 103 to the terminations at the end surface 102 in some applications, if desired.

The given pattern, as depicted in FIG. 6, includes a central single-core optical fiber 106-4 surrounded by six satellite single-core optical fibers 106-1, 106-2, 106-3, 106-5, 106-6 and 106-7 in a hexagonal pattern. The given pattern was selected so as to mate with the pattern of the cores 181 and 182 of the MCF 180 in FIGS. 1 and 2. Of course, if the pattern of the cores in the MCF 180 were different, the pattern of the single-core fibers 106 in the holder 104 of the ferrule 103 would be modified to mirror the different core pattern of the MCF 180, as will be further explained hereinafter.

Figure 3A:
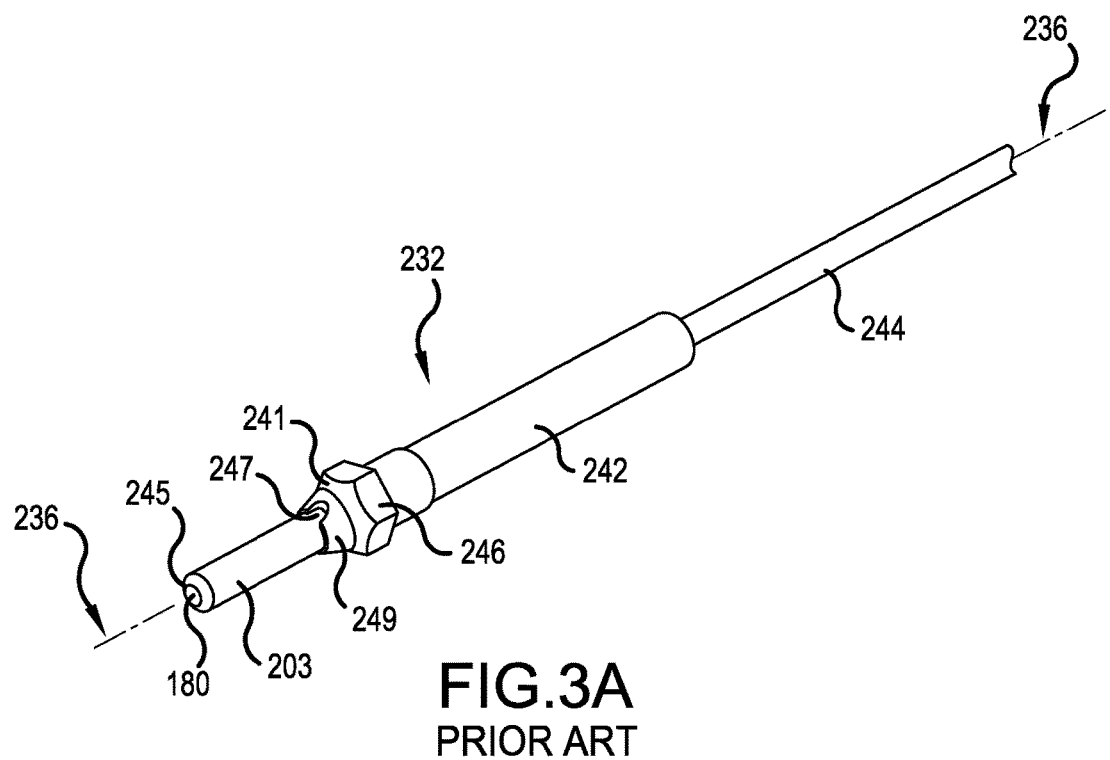
FIG. 3A is a perspective view of a ferrule assembly within the LC fiber optic connector of FIG. 3.

In the first embodiment of the invention, the ferrule 103 is a cylindrical member and the holder 104 is located along a central axis, e.g., axis 236 in FIG. 3A, of the ferrule 103. The holder 104 extends from a first end 105 of the ferrule 103 to a second end of the ferrule 103, with the second end of the ferrule 103 including the end surface 102. The ferrule 103 is suited for use in a connector envelope, like the LC connector depicted in FIG. 3.

Figure 4:
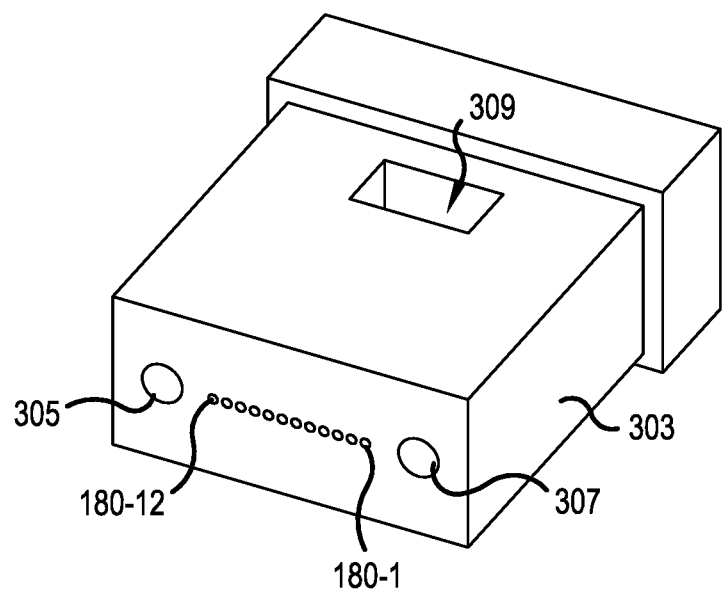
FIG. 4 is a perspective view of an MT ferrule for use in an MTP/MPO fiber optic connector, in accordance with the prior art.
Figure 7:
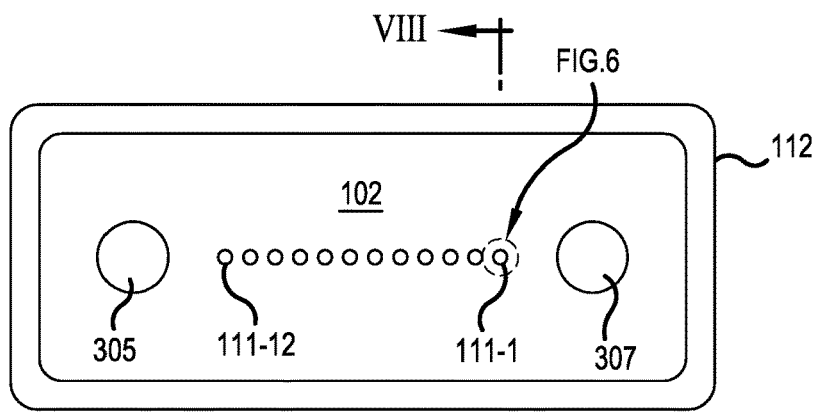
FIG. 7 is an end view of a ferrule, in accordance with a second embodiment of the present invention.
Figure 8:
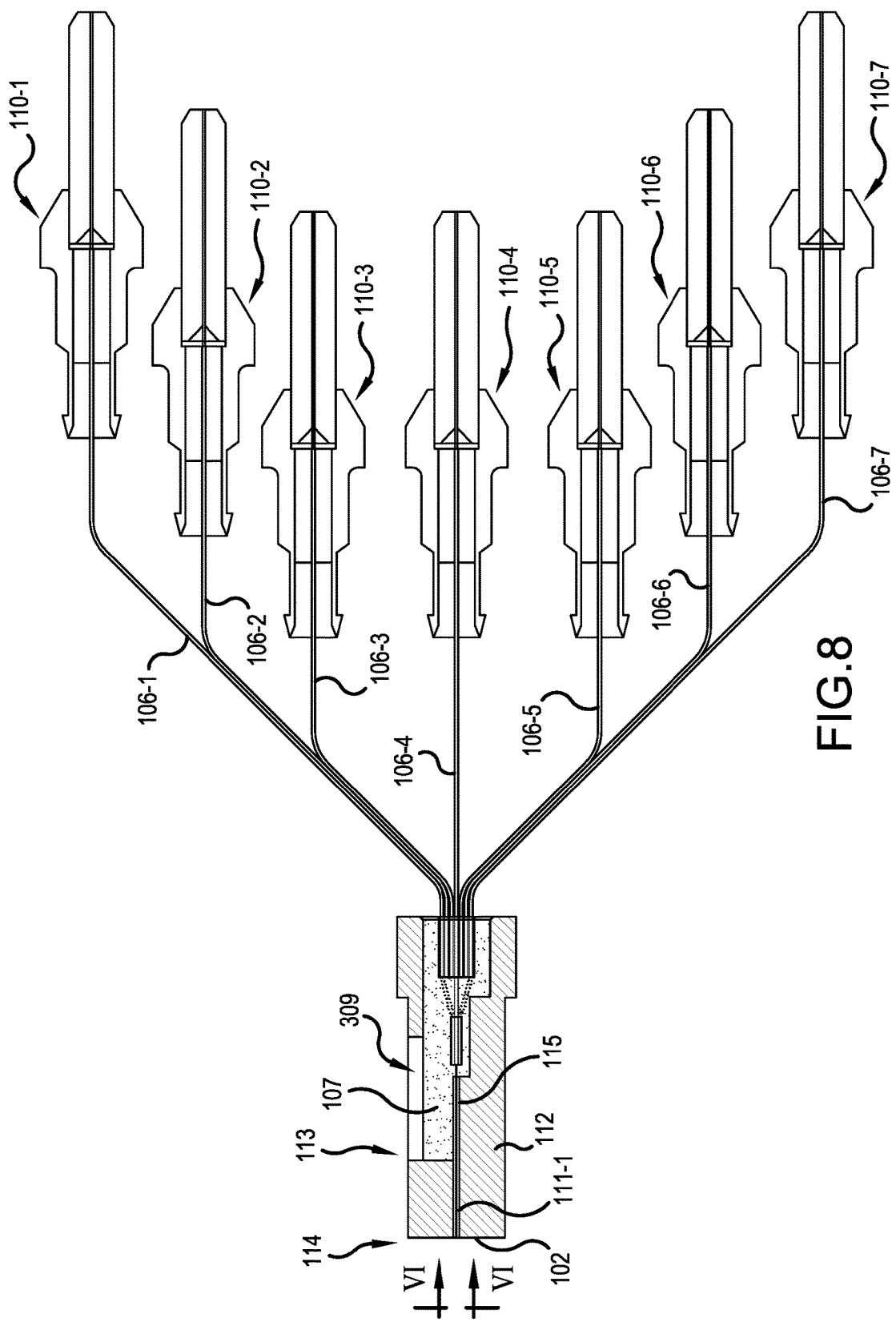
FIG. 8 is a cross sectional view taken along line VIII-VIII in FIG. 7.

In a second embodiment of the present invention, as depicted in FIGS. 7-8, an MT type ferrule 112 is employed. The MT type ferrule 112 may be formed in a same or similar manner as the MT ferrule 303 of FIG. 4. An MT ferrule 112 is but one example of a ferrule having a rectangular cross section. A first holder 111-1 extends from a first end 113 of the ferrule 112 to a second end 114 of the ferrule 112, with the second end 114 of the ferrule 112 including the end surface 102 (see the close-up view of FIG. 6). A second holder 111-2 is formed in the ferrule 112, parallel to the first holder 111-1 and extends from the first end 113 to the second end 114. In particular, FIG. 7 depicts twelve parallel and equally spaced holders 111-1 through 111-12 within the ferrule 112. Of course more or fewer holders 111 may be employed, such as eight holders, and one, two or more rows of holders 111 may be employed. Further, it is not required that the holders 111 be equally spaced or parallel.

FIG. 8 is a cross sectional view taken along line VIII-VIII in FIG. 7. In FIG. 8, epoxy 107 has been flooded into the window 309 to secure the single-core optical fibers 106-1 through 106-7 into V-grooves 115 (also see FIG. 13) and the holders 111-1 through 111-12, e.g., circular channels. In the same manner as described above in conjunction with FIG. 5, the single-core optical fibers 106-1 through 106-7 are fanned out to individual connectors 110-1 through 110-7, respectively. Although FIGS. 5 and 8 have illustrated cylindrical ferrules for the end terminations 110 of the single-core fibers 106, the distal ends of the multiple single-core fibers 106 can be terminated by various traditional methods including but not limited to fusion splice, mechanical splice, multifiber array connectors or any type of single fiber connectors.

Figure 9:
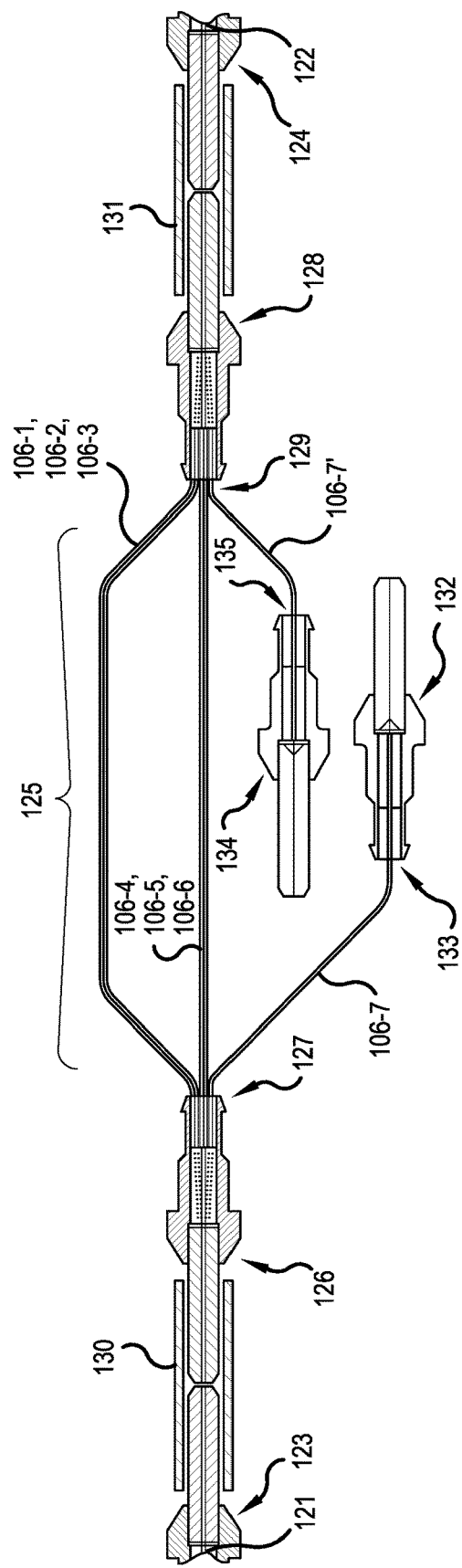
FIG. 9 is a cross sectional view illustrating a jumper made with multiple single core fibers with tap access to one of the single core fibers.

Next, with reference to FIGS. 9-11, a jumper aspect of the present invention will be described. In FIG. 9, first and second MCFs 121 and 122, each include a plurality of cores 181 and 182 arranged in respective patterns. One core of the first MCF 121, e.g., core 182-6, and one core of the second MCF 122, e.g., core 182-6, can be considered a "target" core.

Figure 2:
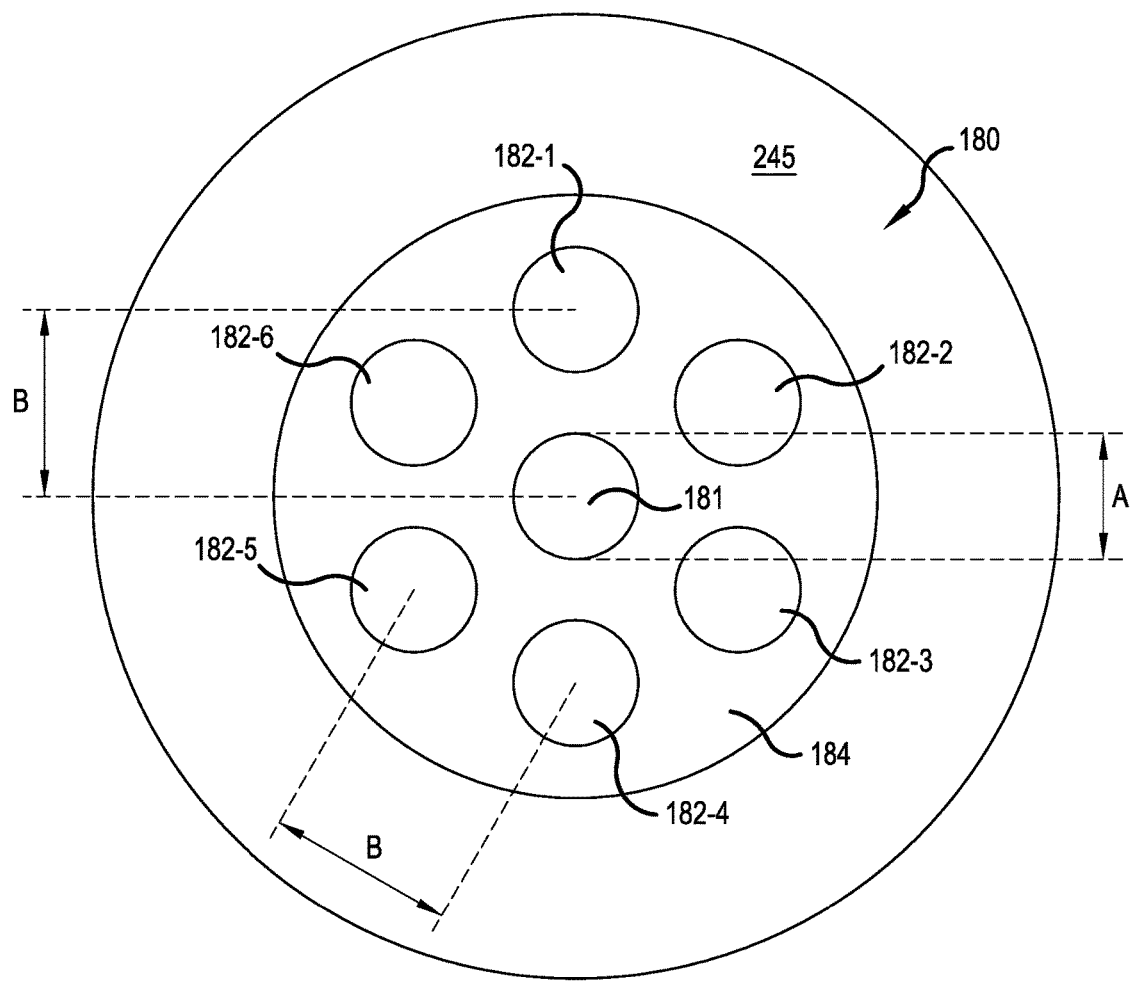
FIG. 2 is an end view of the multi-core optical fiber of FIG. 1, showing the dimensions and spacings of the cores, in accordance with the prior art.

A first connector includes a first ferrule assembly 123 terminating a first end of the first MCF 121 and presenting the plurality of cores 181 and 182 of the first MCF 121 in a first pattern, e.g., the pattern of FIG. 2. A second connector includes a second ferrule assembly 124 terminating a first end of the second MCF 122 and presenting the plurality of cores 181 and 182 of the second multi-core fiber 122 in a second pattern, e.g., the mirror image of FIG. 2.

A multiple fiber segment 125 has a third connector with a third ferrule assembly 126 terminating first ends 127 of the multiple fiber segment 125 and a fourth connector with a fourth ferrule assembly 128 terminating second ends 129 of the multifiber segment 125. The third ferrule assembly 126 is connectable to the first ferrule assembly 123, e.g., by a first adapter sleeve 130 of a first adapter, which brings the end surfaces of the first and third ferrule assemblies 123 and 126 into abutment. The fourth ferrule assembly 128 is connectable to the second ferrule assembly 124, e.g., by a second adapter sleeve 131 of a second adapter, which brings the end surfaces of the second and fourth ferrule assemblies 124 and 128 into abutment.

Single-core fibers 106-1 through 106-6 of the multiple fiber segment 125 have their first ends 127 residing within the holder 104 of the third ferrule assembly 126 and arranged in a pattern to align with cores 181 and 182-1 through 182-5 of the first MCF 121 in the first ferrule assembly 123, when the first and third ferrule assemblies 123 and 126 are mated. The single-core fibers 106-1 through 106-6 of the multiple fiber segment 125 have their second ends 129 residing within the holder 104 of the fourth ferrule assembly 128 and arranged in a pattern to align with cores 181 and 182-1 through 182-5 of the second MCF 122 in the second ferrule assembly 124, when the fourth and second ferrule assemblies 128 and 124 are mated.

The multiple fiber segment 125 has a first target fiber, e.g., single-core fiber 106-7, extending from the third ferrule assembly 126 to a first jumper ferrule 132 of a first jumper connector (not shown) located at a free, second end 133 of the first target fiber, e.g., single-core fiber 106-7. A termination, first end 127 of the first target fiber 106-7 within the third ferrule assembly 126 is aligned with a termination end of the target core 182-6 of the first MCF 121 within the first ferrule assembly 123, when the first and third ferrule assemblies 123 and 126 are mated. A second target fiber, e.g., single-core fiber 106-7', extends from the fourth ferrule assembly 128 to a second jumper ferrule 134 of a second jumper connector (not shown) located at a free end 135 of said second target fiber, e.g., single core fiber 106-7'. A termination end 129 of the second target fiber 106-7' within the fourth ferrule assembly 128 is aligned with a termination end of the target core 182-6 of the second MCF 122 within said second ferrule assembly 124, when the fourth and second ferrule assemblies 128 and 124 are mated.

Figure 10:
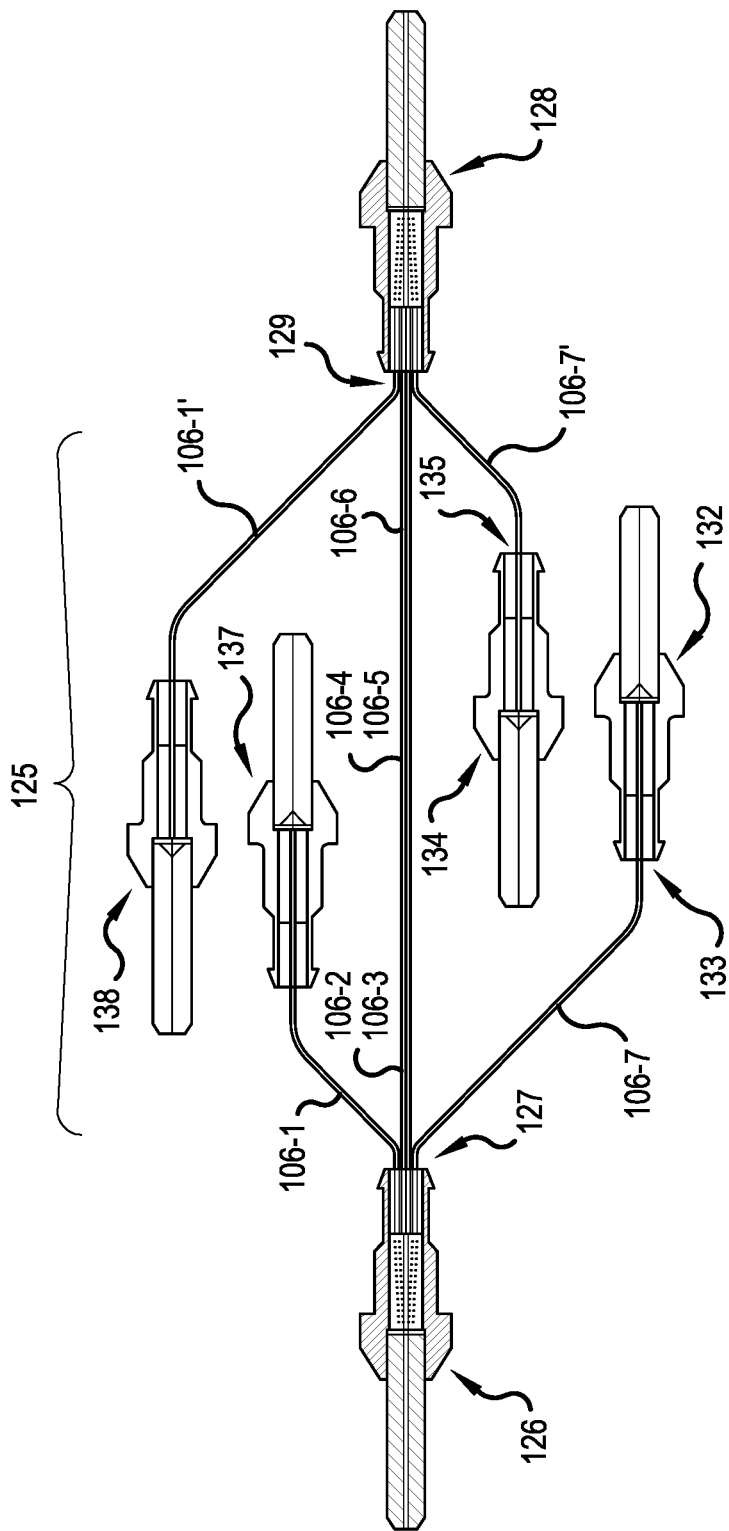
FIG. 10 is a cross sectional view illustrating a jumper made with multiple single core fibers with tap access to two of the single core fiber.

FIG. 10 illustrates that jumper cordage, in accordance with the present invention, may include taps for more than one single-core fiber in the multiple fiber segment 125. For example, in addition to forming a tap on single-core fiber 106-7, 106-7' using first and second jumper ferrules 132 and 134, it is possible to also introduce a tap in single-core fiber 106-1, 106-1' using third and fourth jumper ferrules 137 and 138.

Figure 11:
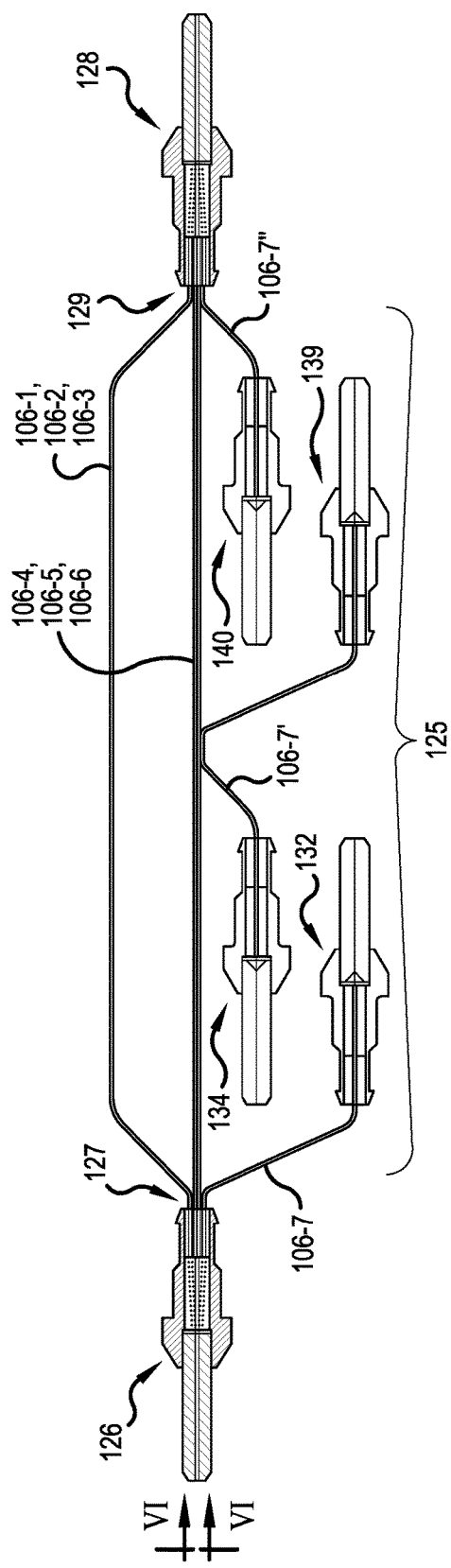
FIG. 11 is a cross sectional view illustrating a jumper made with multiple single core fibers with tap access in two locations for one of the single core fibers.

FIG. 11 illustrates that the jumper cordage, in accordance with the present invention, may include several taps along a same single-core fiber 106-7, 106-7' and 106-7" within the multiple fiber segment 125. For example, single-core fiber 106-7, 106-7' and 106-7" may have a first jumper formed at first and second jumper ferrules 132 and 134 and a second jumper formed at fifth and sixth jumper ferrules 139 and 140.

Although FIGS. 9-11 have illustrated three variations of jumper cordage with taps, it should be appreciated that many variations are possible, whereby more than two single-core fibers 106 could be tapped and more than two taps could be inserted along one single-core fiber 106. In principal, one or more single-core fibers 106 of the plurality of single core fibers 106 may be terminated while the remaining single core fibers 106 connect first and second MCFs 121 and 122. Placing a multiple fiber jumper between two multi-core fibers 121 and 122, cutting one of the single-core fibers 106 and terminating each free end of the cut or target fiber 106 allows signals on that terminated target fiber 106 to be used in the middle of a length of the multiple fiber jumper without the need to individually terminate every one of the single-core fibers 106 of the jumper at the usage point. In a security system, for example, having a number of sensors that need to communicate with a base station, each sensor could communicate over a different individual fiber, which fiber could connect to its particular sensor at different physical locations along the jumper, using the arrangements of FIGS. 9-11.

FIGS. 12-16 illustrate an embodiment wherein the walls forming the holder create an alignment structure to assist in forming the single-core fibers 106 into the desired pattern, e.g., FIG. 6, to match the pattern of optical cores 181, 182 in the MCF 180 to which the ferrule is connectable. In the case of the pattern of FIGS. 1 and 2, a circular holder 104, as shown in FIG. 6 works well. However, for other patterns, a differently shaped holder can offer advantages.

Figure 12:
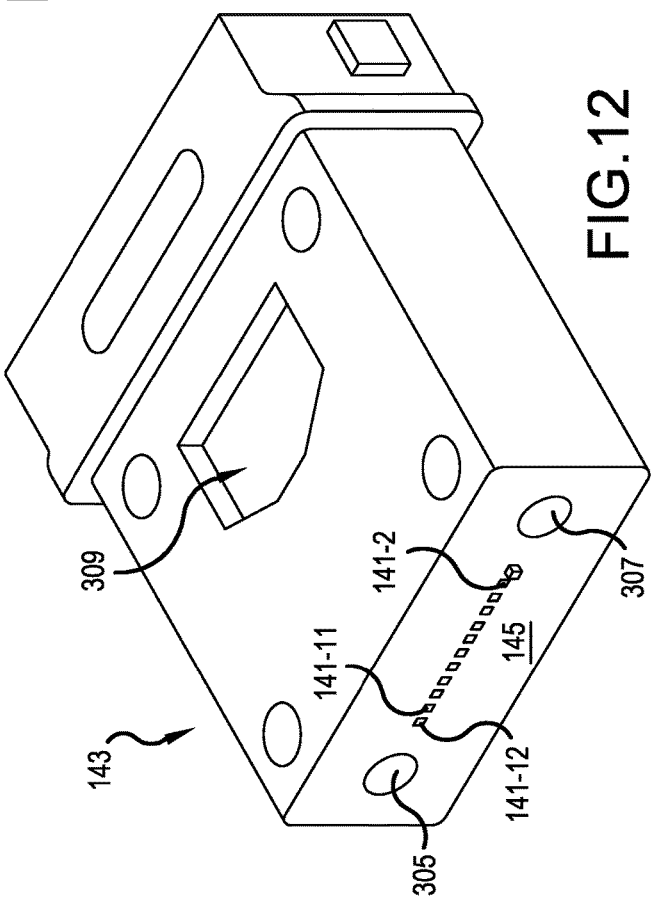
FIG. 12 is a perspective view showing an MT type ferrule with a holder having a cross sectional shape to assist in gathering of single-core fibers into a pattern suitable to mate with a MCF.
Figure 13:
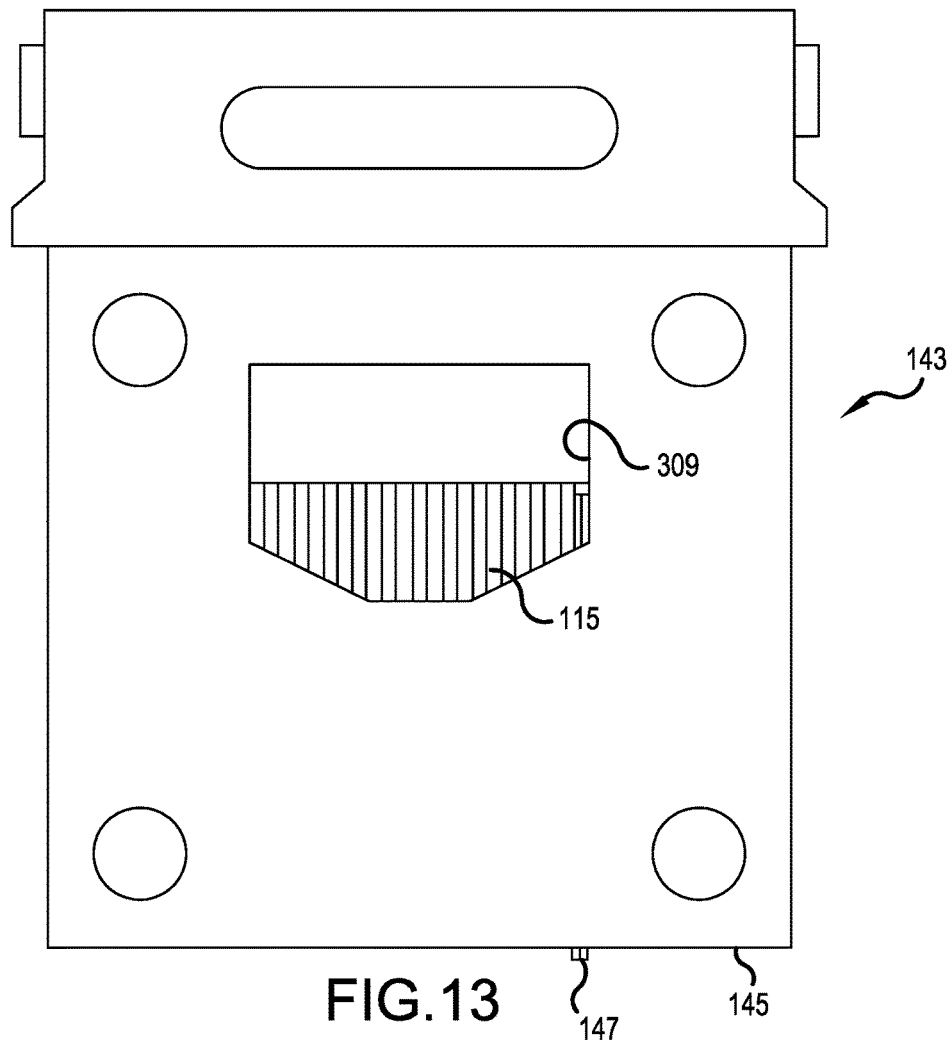
FIG. 13 is a top view of the ferrule of FIG. 12.
Figure 14:
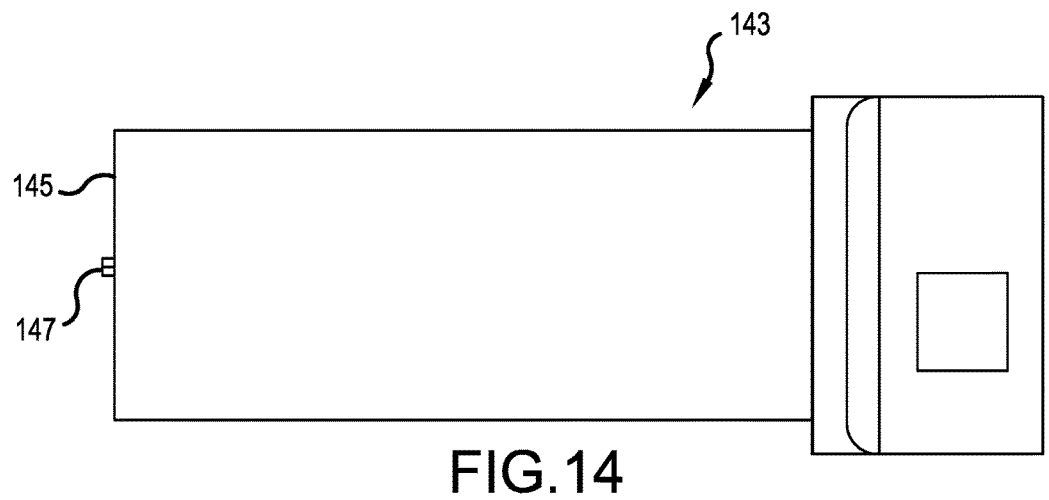
FIG. 14 is a side view of the ferrule of FIG. 12.

FIG. 12 is a perspective view showing an MT ferrule 143 with holders 141-1 through 141-12 extending to a mating face or end surface 145. FIGS. 13 and 14 are top and side views, respectively, of the ferrule 143. The MT ferrule 143 is the same or similar to the MT ferrule of FIG. 4, except for the cross sectional shape of the holders 141-1 through 141-12.

Figure 15:
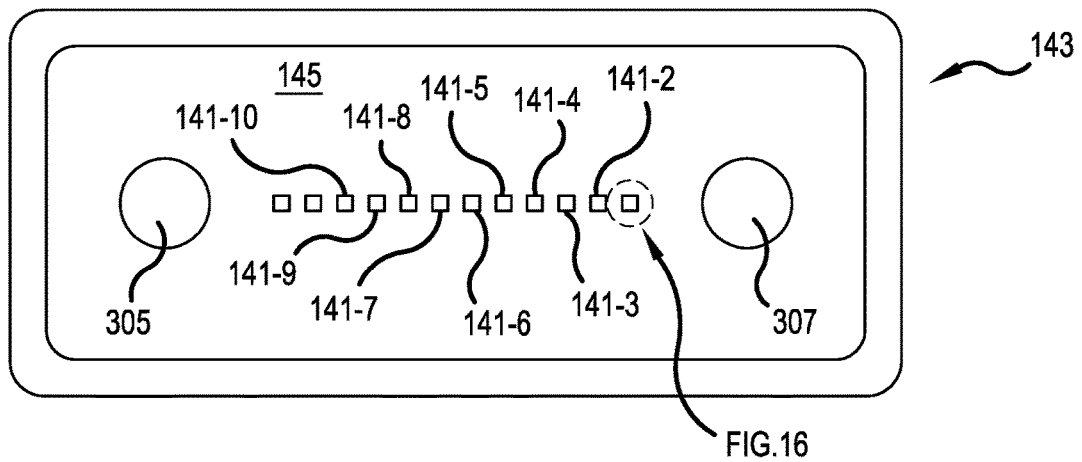
FIG. 15 is an end view of the ferrule of FIG. 12.

FIG. 15 is an end view of the MT ferrule 143 showing the end surface 145. The first holder 141-1 is populated with four single-core fibers 147-1, 147-2, 147-3 and 147-4, the remaining holders 141-2 through 141-12 are empty in FIGS. 12-15, but may be populated with plural single-core fibers or a MCF, as desired in the end use.

Figure 16:
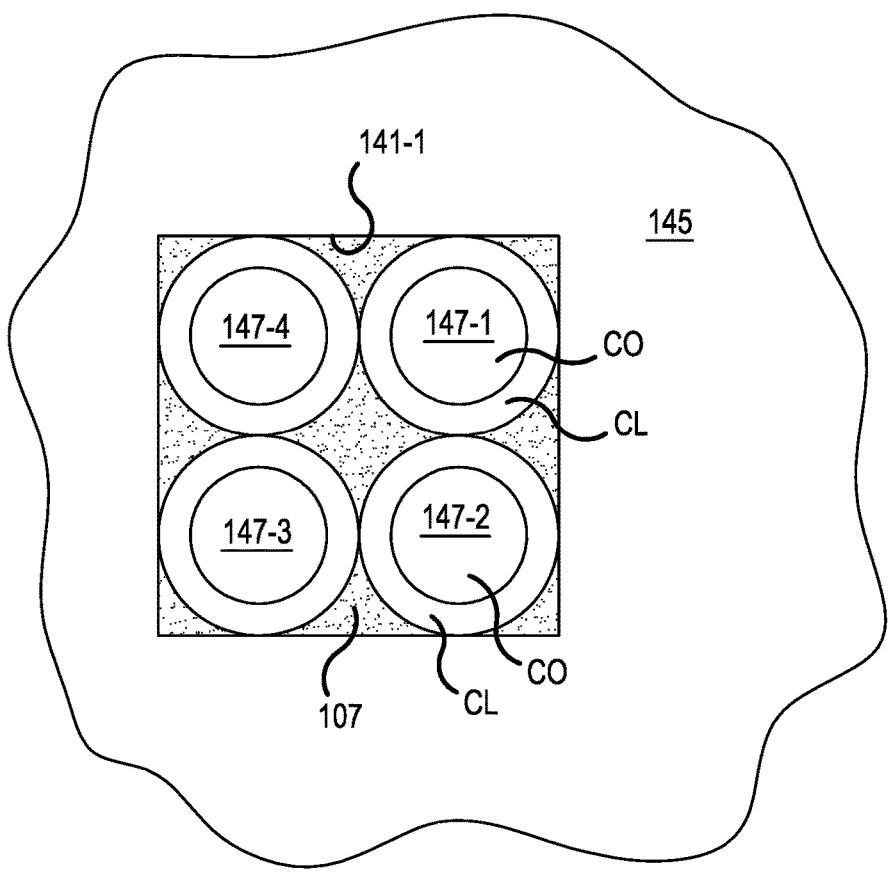
FIG. 16 is a close-up view of one of the holders in FIG. 15.

FIG. 16 is a close-up view the first holder 141-1. The square cross sectional shape of the first holder 141-1 assists in the gathering of the single-core fibers 147-1, 147-2, 147-3 and 147-4 into a desired pattern. In the depicted embodiment, the desired pattern would be suitable to mate with a MCF having four cores in the same ordering. Of course, other alignment features of the holders could create other cross sectional shapes besides a square cross sectional shape. In general, the cross sectional shape may be formed by one or more intersecting edges defining a border of the holder, wherein the cross section of the holder is taken perpendicular to the direction in which the holder extends. Any such cross sectional shape with one or more intersecting side edges could be used to assist in assembling the single-core fibers into a desired pattern, such as a D-shaped cross sectional shape or a triangular-shaped cross sectional shape.

In the embodiments, presented above, the single-core fibers 106 or 147 presented by the holders 104, 111, 141 were equal in number to the number of cores 181 and 182 presented by the MCF 180. However, the teachings of the present invention may be applied to a situation wherein the number of single core fibers 106 or 147 may be fewer in number than the cores 181 and 182 of the MCF 180, as will be described below.

Figure 17:
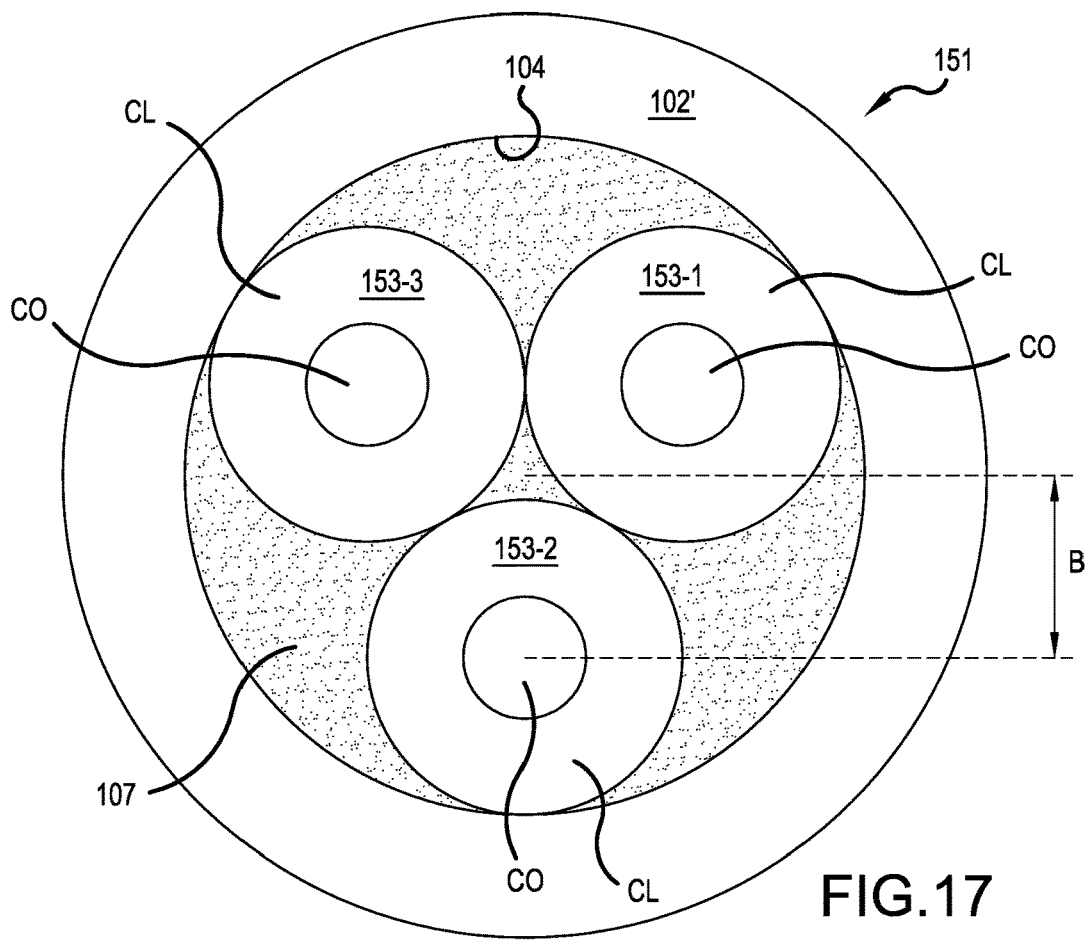
FIG. 17 is an end view of a ferrule holding three single-core fibers dimensioned to mate with a subset of cores within the MCF of FIGS. 1-2.

FIG. 17 is an end view of a holder 104 within a ferrule 151. FIG. 17 is similar to the view of FIG. 6, however in FIG. 17, the holder 104 presents the ends of three single-core fibers 153-1, 153-2 and 153-3 at the end surface 102' of the ferrule 151. The diameter of the core CO of each single-core fiber 153-1, 153-2 and 153-3 is the same as the diameter of the cores CO of the single-core fibers 106 in FIG. 6 and the same as the diameter of the cores 181 and 182 of MCF 180 in FIG. 2, i.e., dimension A or about 26 um. The cladding CL of each single-core fiber 153-1, 153-2 and 153-3 is much thicker and presents a larger diameter than the cladding CL of the single-core fibers 106 in FIG. 6. The cladding CL creates an offset distance B from the center of the holder 104 to the centers of the cores CO of each single-core fiber 153, i.e., equal to the offset B depicted in FIGS. 2 and 6.

Figure 18:
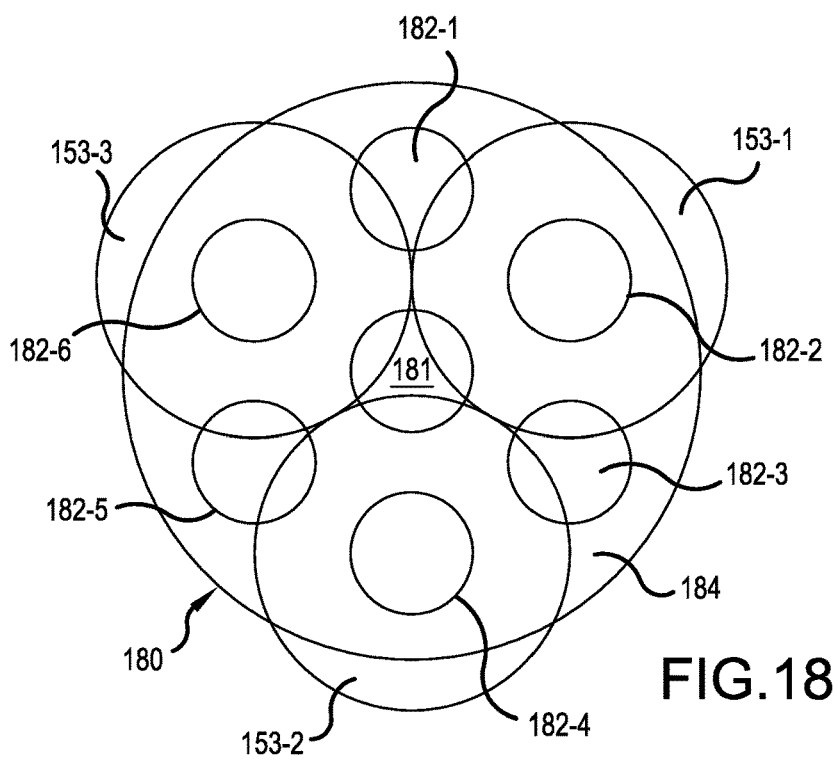
FIG. 18 is a diagram illustrating the overlapping of cores between the arrangement of FIG. 17 and the arrangement of FIG. 1.

The oversized cladding CL of each single-core fiber 153 creates an offset between the cores CO of the single-core fibers 153, such that when the end surface 102' of ferrule 151 is abutted to the end surface 245 of a ferrule holding MCF 180, e.g., during connector mating via an adapter, the three cores CO of the single-core fibers 153, as presented at the end surface 102' will align with three satellite cores 182 of the MCF 180. More particularly, as shown in the diagram of FIG. 18, the core CO of single-core fiber 153-1 aligns to the core 182-2 of MCF 180, the core CO of single-core fiber 153-2 aligns to the core 182-4 of MCF 180, and the core CO of single-core fiber 153-3 aligns to the core 182-6 of MCF 180. The termination of FIG. 17 is useful as a fanout or breakout of a MCF 180, wherein only satellite cores 182-2, 182-4 and 182-6 are bright, e.g., used in the MCF 180, or are needed by a particular piece of equipment connected downstream of the termination of the MCF 180.

FIG. 18 demonstrates a general concept in accordance with the present invention that one may couple a MCF containing n cores to a greater number or a fewer number of single-core fibers by selecting individual fibers with smaller or larger cladding and a geometric relationship that aligns the fiber cores. For example, an MCF 180 made with seven 26 micron diameter cores, six equally spaced around one on a radius of 39 microns, e.g., FIG. 2, could be mated to three individual fibers each of 67.55 micron nominal cladding diameter with 26 micron diameter single cores, e.g., FIG. 17. The group of three separate fibers 153-1, 153-2 and 153-3 is bonded into a single holder 104, e.g., a through hole or groove, in a single fiber or a multi-fiber connector ferrule 151. The holder 104 in the ferrule 151 may have a circular cross section, a triangular cross section, or other cross sectional geometry that accurately positions the fiber.

Figure 19:
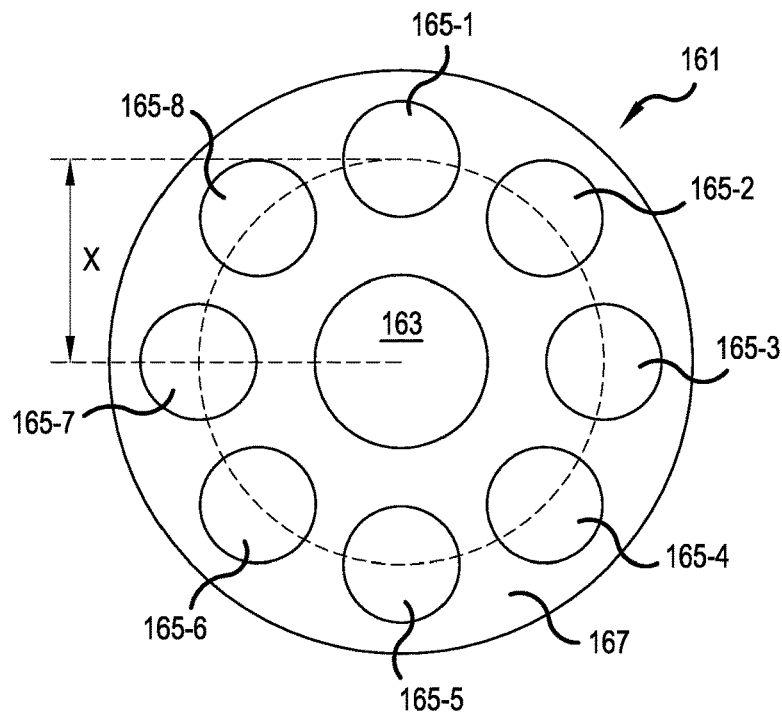
FIG. 19 is an end view of an alternate multi-core optical fiber having eight satellite cores surrounding a larger central core.

FIG. 19 illustrates an alternative design for a MCF 161. The MCF 161 includes a central core 163 and eight satellite cores 165-1 through 165-8. Each satellite core 165-X is spaced from a center of the central core 163 by a same distance X. Further, each satellite core 165 is equally spaced from each other along a radius line (indicated by a dashed line in FIG. 19) located at distance X from the center of the central core 163. Other than the sizing and spacing, the MCF 161 may be identical in structure, function, and material as the MCF 180 described above.

Figure 20:
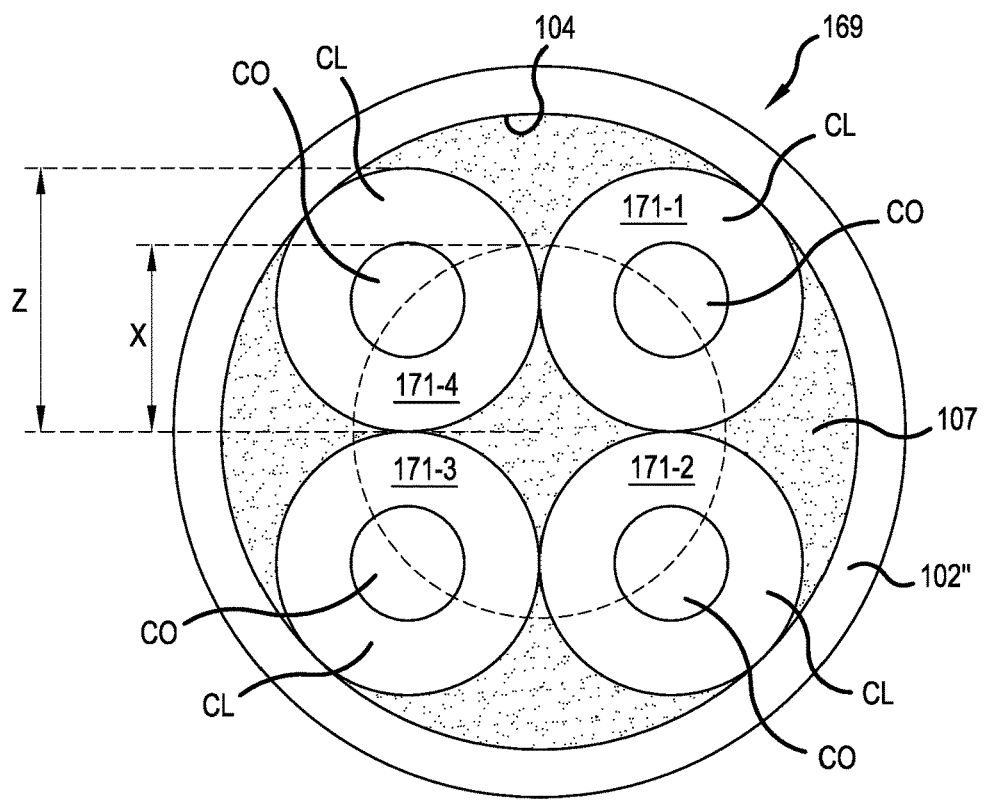
FIG. 20 is an end view of a ferrule holding four single-core fibers dimensioned to mate with a subset of cores within the MCF of FIG. 19.

FIG. 20 is an end view of a holder 104 within a ferrule 169. FIG. 20 is similar to the view of FIG. 6, however in FIG. 20, the holder 104 presents the ends of four single-core fibers 171-1, 171-2, 171-3 and 171-4 at the end surface 102" of the ferrule 169. A diameter of the core CO of each single-core fiber 171-1, 171-2, 171-3 and 171-4 is the same as the diameter of the satellite cores 165 of the MCF 161. A diameter Z of the cladding CL of the single-core fibers 171 creates an offset distance X from the center of the holder 104 to the centers of the cores CO of each single-core fiber 171, i.e., equal to the offset X depicted in FIG. 19.

Figure 21:
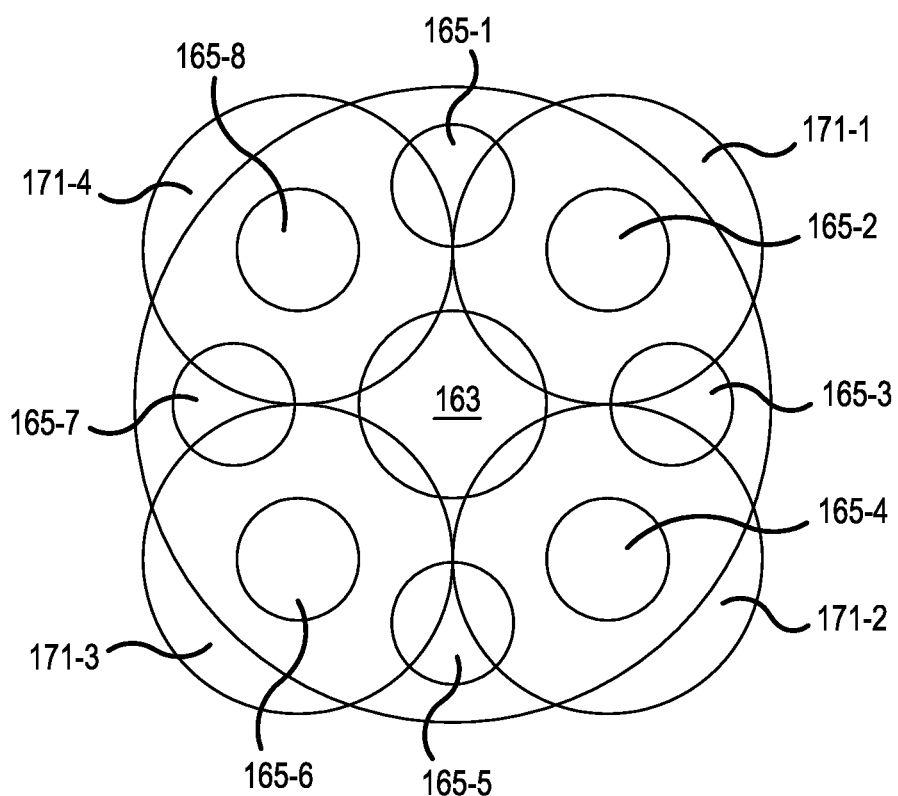
FIG. 21 is a diagram illustrating the overlapping of cores between the arrangement of FIG. 19 and the arrangement of FIG. 20.

The oversized cladding CL of each single-core fiber 171 creates an offset between the cores CO of the single-core fibers 171, such that when the end surface 102" of ferrule 169 is abutted to the end surface of a ferrule holding MCF 161 (FIG. 19), e.g., during connector mating via an adapter, the four cores CO of the single-core fibers 171, as presented at the end surface 102", will align with four satellite cores 165 of the MCF 161. More particularly, as shown in the diagram of FIG. 21, the core CO of single-core fiber 171-1 aligns to the core 165-2 of MCF 161, the core CO of single-core fiber 171-2 aligns to the core 165-4 of MCF 161, the core CO of single-core fiber 171-3 aligns to the core 165-6 of MCF 161, and the core CO of single-core fiber 171-4 aligns to the core 165-8 of MCF 161. The termination of FIG. 20 is useful as a fanout or breakout of a MCF 161, wherein only satellite cores 165-2, 165-4, 165-6 and 165-8 are bright, e.g., used in the MCF 161, or are needed by a particular piece of equipment connected downstream of the termination of the MCF 161.

FIG. 21 demonstrates how four single-core fibers 171 with 33 micron diameter cores and 82.45 micron diameter cladding, e.g., distance Z, equally spaced on a 58.3 micron radius, e.g., distance X, can couple to four cores 165-2, 165-4, 165-6 and 165-8 of a nine core MCF 161 where the eight satellite cores 165 measure 33 microns in diameter and are equally spaced on a 58.3 micron radius. The group of four separate fibers 171 is bonded into a single holder 104, e.g., through hole or groove, in a single fiber or a multi-fiber connector ferrule 169. The holder 104 of the ferrule 169 may have a circular cross section, a square cross section (like FIGS. 12, 15 and 16) or other cross sectional geometry that accurately positions the single-core fibers 171.

The connector system as described above including a fanout or a jumper with or without taps may be produced by a method including providing a ferrule having an end surface, a holder formed in the ferrule and extending up to the end surface, and a plurality of single-core optical fibers.

Inserting the plurality of single-core optical fibers into the holder with first ends of the single-core fibers residing approximately at, or extending out from the end surface of the ferrule. To facilitate the insertion step, an inner diameter of the holder in the ferrule may be slightly larger, e.g., approximately one micron larger, than the collective diameter of the group single-core fibers. For example, in a six around one configuration (FIG. 6), the collective diameter of the six-around-one configuration is equal to three times a center cladding diameter or three times a satellite cladding diameter.

Arranging the first ends of the plurality of single-core fibers into a desired ordering relative to the ferrule. The fibers can be rotated and clocked within the ferrule to a keying feature on the ferrule, ferrule barrel or connector housing. The arranging is performed prior to any epoxy curing and creates the desired pattern to allow for direct connection or cross connection at the ferrule end surface. The fibers may also be clocked and cured randomly in the ferrule, and then the ferrule is later oriented in a connector, so as to clock the ferrule to clocking features of the connector. The pattern of the single-core fibers can be mirror images, as viewed at the end surfaces of ferrule assemblies 126 and 128 in FIG. 9 or may be the same patterns, i.e., not mirror images. Hence, it is possible to reorder the single-core fibers in the satellite positions along the length of the jumper cable, which may prove useful to provide correct routing of signals between transmitters and receivers within single cords or when concatenating cords and/or cables. The reordering of single-core fibers in satellite and/or center positions could also be used as a keying function to protect data, so that only a cord with properly re-routed single-core fibers would link the MCF 180 into a port of a device in a required ordering to allow for communication between the device and the MCF 180.

Epoxy may be used in adhering the single-core fibers within the holder. The epoxy may be inserted into the ferrule before or after the single-core fibers, and capillary action will draw inviscid epoxy through the longitudinal voids between the ferrule and single-core fibers. An epoxy with appropriate index of refraction may be used to create tunnels or capture light between fibers to reduce crosstalk. The refractive index of the epoxy may be selected to either reduce or increase cross-talk between the multiple fibers in the holder. Minimizing cross-talk is often desirable. However, under some circumstances, it may be desirable to use one of the single-core fibers to eavesdrop on another single-core fiber. For example, the center single core fiber 106-4 in FIG. 6 can be used to eavesdrop on the single-core fibers in satellite positions. By selecting an epoxy having an index of refraction that allows signals to leak from the center single-core fiber 106-4 to one of the satellite fibers, e.g., 106-1, the satellite single-core fiber 106-1 can be monitored to reveal data on the center single-core fiber 106-4, or visa versa, in an unobtrusive manner. Hence, the present invention could be employed for example to provide a tapping location for the center single-core fiber 106-4, while the center single-core fiber 106-4 and the remaining satellite single-core fibers 106-1 through 106-3 and 106-5 through 106-7 travel through the jumper to another connector where they connect to another MCF.

Finally, the method for forming a termination, in accordance with the present invention, includes cleaving and/or polishing the first ends of the plurality of single-core fibers. The Cleaving and/or polishing may be performed at the end surface of the ferrule. The above steps create the termination (FIG. 6) in a holder of a ferrule to mate with a first MCF. If a fanout is to be produced, connectors or ferrules are installed at each second end of the plurality of single-core fibers 106, e.g. as depicted in FIGS. 5 and 8. If a jumper is to be produced, second ends of several of, or all of, the plurality of single-core fibers 106 are installed into a second holder of a second ferrule, e.g. as depicted in FIGS. 9-11.

Although the depicted embodiments have shown a single cladding layer surrounding the single-core fibers and a single cladding layer surround the MCF, some MCF and single core fibers may include a secondary outer cladding. The principals and teachings of the invention still apply and the dimensions and spacing can be adjusted to treat the secondary cladding as a simply a thicker single cladding layer. The invention defined herein also pertains to single and multi-core fibers with cladding diameters that may be constant over the length of the fiber or taper larger or smaller over the length of the fiber.

The invention defined herein also applies to MCFs with cores arranged in rectangular arrays or non-symmetrically, or with combinations of single-mode (SM) or multi-mode (MM) cores or with arrangements where one or more of the "core" locations in the MCF is replaced by a smaller multi-core fiber. Although the MCF 180 has been illustrated with a circular outer perimeter, the MCF 180 can be made with a D shaped cross section creating a flat that runs longitudinally along the MCF 180 for a portion or all of its length. The satellite single-core fibers 106-1 through 106-3 and 106-5 through 106-7 can be clocked or oriented relative to the flat of the MCF 180. The flat can align to a flat on D-shaped holder 104 or 111-1 in the ferrule 103 or 112 providing a means of clocking the satellite single-core fibers 106-1 through 106-3 and 106-5 through 106-7 relative to the ferrule 103 and 112 and relative to the MCF 180. The connector housings have been omitted from the ferrules in the figures depicting the present invention for the sake of clarity.

The present invention has been described above in terms of several preferred embodiments. However, modifications and additions to these embodiments will become apparent to persons of ordinary skill in the art upon a reading of the foregoing disclosure. All such modifications and additions comprise a part of the present invention to the extent they fall within the scope of the several claims appended hereto.

We claim:

1. A connector system in the form of a single optical connector comprising:
    a ferrule having an end surface;
    a holder formed in said ferrule and formed as a single opening or groove extending up to said end surface, wherein said holder includes an alignment structure including one or more intersecting edges defining said holder, as viewed in a cross section of said holder taken perpendicular to the direction in which said holder extends, wherein said alignment structure extends through to said end surface; and
    a plurality of single-core optical fibers mounted in said holder in an abutting relationship with each other along a length of said holder.

2. The connector system of claim 1, wherein the cross section of said edges presents a square-shaped cross section or a D-shaped cross section or a triangular-shaped cross section.

3. The connector system of claim 2, wherein the cross section of said edges presents a square-shaped cross section.

4. The connector system of claim 1, wherein said ferrule is a cylindrical member and said holder is located along a central axis of said ferrule and extends from a first end of said ferrule to a second end of said ferrule, with said second end of said ferrule including said end surface.

5. The connector system of claim 4, further comprising: an LC connector envelope holding said ferrule.

6. The connector system of claim 4, wherein first ends of said plurality of single-core optical fibers are arranged in a given abutting pattern at said end surface of said ferrule.

7. The connector system of claim 6, wherein said given pattern is selected to match a pattern of optical cores in a multi-core fiber to which said ferrule is connectable.

8. The connector system of claim 6, wherein cladding layers or acrylate layers of said plurality of single-core optical fibers abut each other at said end surface of said ferrule.

9. The connector system of claim 1, wherein said holder is a first holder and extends to an end of said ferrule, with said end of said ferrule including said end surface, and further comprising:
a second holder formed in said ferrule and formed as a single opening or groove extending to said end of said ferrule including said end surface, wherein said second holder includes an alignment structure including one or more intersecting edges defining said second holder, as viewed in a cross section of said second holder taken perpendicular to the direction in which said second holder extends.

10. The connector system of claim 9, wherein said ferrule is an MT type ferrule.

11. A connector system in the form of a cord with an optical connector at each end comprising:
a first ferrule having a first end surface;
a first holder formed in said first ferrule and formed as a single opening or groove extending up to said first end surface;
a plurality of single-core optical fibers mounted in said first holder in an abutting relationship along a length of said first holder, with first ends of said plurality of single-core optical fibers arranged in a first given pattern at said first end surface of said first ferrule;
a second ferrule having a second end surface; and
a second holder formed in said second ferrule and formed as a single opening or groove extending up to said second end surface, wherein second ends of said plurality of single-core optical fibers are arranged in a second given pattern at second end surface of said second ferrule.

12. The connector system of claim 11, wherein said plurality of single-core optical fibers remain in a same order as presented by said first pattern as said plurality of single-core optical fibers enter said second holder and proceed through said second holder to said second end face.

13. The connector system of claim 12, further comprising:
a third ferrule having a third end surface;
a third holder formed in said third ferrule and formed as a single opening or groove extending up to said third end surface;
a first multi-core optical fiber including a plurality of cores arranged in a third given pattern; said first multi-core optical fiber being mounted in said third holder with a first end of said first multi-core optical fiber being located at said third end surface of said third ferrule, wherein when said third ferrule is mated to said first ferrule, each one of said first ends of said plurality of single-core optical fibers is aligned with a respective one of said cores of said first multi-core optical fiber;
a fourth ferrule having a fourth end surface;
a fourth holder formed in said fourth ferrule and formed as a single opening or groove extending up to said fourth end surface; and
a second multi-core optical fiber including a plurality of cores arranged in a fourth given pattern; said second multi-core optical fiber being mounted in said fourth holder with a first end of said second multi-core optical fiber being located at said fourth end surface of said fourth ferrule, wherein when said fourth ferrule is mated to said second ferrule, each one of said second ends of said plurality of single-core optical fibers is aligned with a respective one of said cores of said second multi-core optical fiber.

14. The connector system of claim 11, wherein said plurality of single-core optical fibers are reordered to present a different order as compared to said first pattern before said plurality of single-core optical fibers enter said second holder and proceed through said second holder to said second end face.

15. The connector system of claim 14, further comprising:
a third ferrule having a third end surface;
a third holder formed in said third ferrule and formed as a single opening or groove extending up to said third end surface;
a first multi-core optical fiber including a plurality of cores arranged in a third given pattern; said first multi-core optical fiber being mounted in said third holder with a first end of said first multi-core optical fiber being located at said third end surface of said third ferrule, wherein when said third ferrule is mated to said first ferrule, each one of said first ends of said plurality of single-core optical fibers is aligned with a respective one of said cores of said first multi-core optical fiber;
a fourth ferrule having a fourth end surface;
a fourth holder formed in said fourth ferrule and formed as a single opening or groove extending up to said fourth end surface; and
a second multi-core optical fiber including a plurality of cores arranged in a fourth given pattern; said second multi-core optical fiber being mounted in said fourth holder with a first end of said second multi-core optical fiber being located at said fourth end surface of said fourth ferrule, wherein when said fourth ferrule is mated to said second ferrule, each one of said second ends of said plurality of single-core optical fibers is aligned with a respective one of said cores of said second multi-core optical fiber.

16. A connector system in the form of mating optical connectors comprising:
a first ferrule having a first surface;
a first holder formed in said first ferrule and formed as a single opening or groove extending up to said first end surface;
a plurality of single-core optical fibers mounted in said first holder in an abutting relationship along a length of said first holder, with first ends of said plurality of single-core optical fibers arranged in a first given pattern at said first end surface of said first ferrule;
a second ferrule having a second end surface;
a second holder formed in said second ferrule and formed as a single opening or groove extending up to said second end surface; and
a multi-core optical fiber including a plurality of cores arranged in a second given pattern, said multi-core optical fiber being mounted in said second holder with a first end of said multi-core optical fiber being located at said second end surface of said second ferrule, wherein said second given pattern includes a greater number of cores than said first given pattern includes of first ends of said plurality of single-core optical fibers, and wherein when said second ferrule is mated to said first ferrule, said first ends of said plurality of single-core optical fibers mate to select ones of said cores of said multi-core optical fiber.

17. The connector system of claim 16, wherein a distance between adjacent first ends of said plurality of single-core optical fibers at said first end surface is greater than a distance between adjacent cores within said multi-core optical fiber.

18. The connector system of claim 17, wherein said first holder is formed as a single opening or groove having a cross section configured to position and/or angularly align said first ends of said plurality of single-core optical fibers.

19. The connector system of claim 18, wherein the cross section includes one or more intersecting edges defining said first holder, and wherein the cross section of said edges presents a square-shaped cross section or a D-shaped cross section or a triangular-shaped cross section.

20. The connector system of claim 19, wherein the cross section of said one or more edges presents a square-shaped cross section.

\* \* \* \* \*